United States Patent
Pillai et al.

(10) Patent No.: US 11,176,709 B2
(45) Date of Patent: Nov. 16, 2021

(54) SYSTEMS AND METHODS FOR SELF-SUPERVISED SCALE-AWARE TRAINING OF A MODEL FOR MONOCULAR DEPTH ESTIMATION

(71) Applicant: Toyota Research Institute, Inc., Los Altos, CA (US)

(72) Inventors: Sudeep Pillai, Mountain View, CA (US); Rares A. Ambrus, San Francisco, CA (US); Vitor Guizilini, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 167 days.

(21) Appl. No.: 16/655,801

(22) Filed: Oct. 17, 2019

(65) Prior Publication Data
US 2021/0118184 A1  Apr. 22, 2021

(51) Int. Cl.
*G06T 7/00* (2017.01)
*G01B 11/22* (2006.01)
(Continued)

(52) U.S. Cl.
CPC ............. *G06T 7/97* (2017.01); *G01B 11/22* (2013.01); *G06F 9/30196* (2013.01);
(Continued)

(58) Field of Classification Search
CPC .. G06T 7/97; G06T 7/80; G06T 7/521; G01B 11/22; G06F 9/30196; G06K 9/6259; G06N 3/08; G06N 3/0418; G01S 17/89
See application file for complete search history.

(56) References Cited

U.S. PATENT DOCUMENTS

2013/0335575 A1* 12/2013 Tsin ..................... G06T 7/251
348/169
2014/0010407 A1* 1/2014 Sinha ................. G06K 9/00664
382/103
(Continued)

FOREIGN PATENT DOCUMENTS

WO   2018052875 A1   3/2019
WO   2019099684 A1   5/2019

OTHER PUBLICATIONS

Zhou et al., "Unsupervised Learning of Depth and Ego-Motion from Video", found at: arXiv:1704.07813v2 [cs.CV] Aug. 1, 2017.
(Continued)

*Primary Examiner* — Ming Y Hon
(74) *Attorney, Agent, or Firm* — Christopher G. Darrow; Darrow Mustafa PC

(57) ABSTRACT

System, methods, and other embodiments described herein relate to self-supervised training of a depth model for monocular depth estimation. In one embodiment, a method includes processing a first image of a pair according to the depth model to generate a depth map. The method includes processing the first image and a second image of the pair according to a pose model to generate a transformation that defines a relationship between the pair. The pair of images are separate frames depicting a scene of a monocular video. The method includes generating a monocular loss and a pose loss, the pose loss including at least a velocity component that accounts for motion of a camera between the training images. The method includes updating the pose model according to the pose loss and the depth model according to the monocular loss to improve scale awareness of the depth model in producing depth estimates.

20 Claims, 4 Drawing Sheets

(51) Int. Cl.
| | |
|---|---|
| *G06T 7/80* | (2017.01) |
| *G06F 9/30* | (2018.01) |
| *G06K 9/62* | (2006.01) |
| *G06N 3/08* | (2006.01) |
| *G06N 3/04* | (2006.01) |

(52) U.S. Cl.
CPC ......... *G06K 9/6259* (2013.01); *G06N 3/0418* (2013.01); *G06N 3/08* (2013.01); *G06T 7/80* (2017.01)

(56) References Cited

U.S. PATENT DOCUMENTS

| | | | |
|---|---|---|---|
| 2014/0169627 A1* | 6/2014 | Gupta | G06T 5/006 382/103 |
| 2014/0347475 A1* | 11/2014 | Divakaran | G06K 9/00771 348/135 |
| 2018/0231871 A1* | 8/2018 | Wang | G06K 9/00208 |
| 2018/0247429 A1* | 8/2018 | Chandraker | G05D 1/0253 |
| 2020/0258249 A1* | 8/2020 | Angelova | G06T 7/20 |

OTHER PUBLICATIONS

Pillai et al., "Superdepth: Self-Supervised, Super-Resolved Monocular Depth Estimation", found at: arXiv:1810.01849v1 [cs.CV] Oct. 3, 2018.
Godard et al., "Unsupervised Monocular Depth Estimation with Left-Right Consistency", found at: arXiv:1609.03677v3 [cs.CV] Apr. 12, 2017.
Godard et al., "Digging Into Self-Supervised Monocular depth estimation", found at: arXiv:1806.01260v2 [cs.CV] Jun. 5, 2018.
Vijayanarasimhan et al., "SfM-Net: Learning of Structure and Motion from Video", found at: arXiv:1704.07804v1 [cs.CV] Apr. 25, 2017.
Shi et al.,"Real-Time Single Image and Video Super-Resolution Using an Efficient Sub-pixel Convolutional Neural Network", found at: arXiv:1609.05158v2 [cs.CV] Sep. 23, 2016.
He et al., "Deep Residual Learning for Image Recognition", found at: arXiv:1512.03385v1 [cs.CV] Dec. 10, 2015.
Geiger et al., "StereoScan: Dense 3D reconstruction in real-time", in IEEE Int. Veh. Symp., 2011.
Scaramuzza et al., "Appearance-guided monocular omnidirectional visual odometry for outdoor ground vehicles", IEEE Trans. Robotics, 24(5): 1015-1026, 2008.
Eigen et al., "Depth map prediction from a single image using a multi-scale deep network" in Advances in neural information processing systems, pp. 2366-2374, 2014.
Kashyap et al., "Sparse Representations For Object and Ego-motion Estimation in Dynamic Scenes", found at: arXiv:1903.03731v1 [cs.CV] Mar. 9, 2019.
Yang et al., "Deep virtual stereo odometry: Leveraging deep depth prediction for monocular direct sparse odometry" arXiv preprint arXiv:1807.02570, 2018.
Guo et al., "Learning monocular depth by distilling cross-domain stereo networks," found at: arXiv:1808.06586v1 [cs.CV] Aug. 20, 2018.
Geiger et al., "Vision meets robotics: The kitti dataset," The International Journal of Robotics Research, vol. 32, No. 11, pp. 1231-1237, 2013.
Bansal et al., Pixelnet: Representation of the pixels, by the pixels, and for the pixels. arXiv preprint arXiv:1702.06506, 2017.
Casser et al., Depth prediction without the sensors: Leveraging structure for unsupervised learning from monocular videos, found at: arXiv:1811.06152v1 [cs.CV] Nov. 15, 2018.
Badrinarayanan et al., Segnet: A deep convolutional encoder-decoder architecture for image segmentation. IEEE transactions on pattern analysis and machine intelligence, 39(12):2481-2495, 2017.
Cordts, et al., The cityscapes dataset for semantic urban scene understanding, In Proceedings of the IEEE conference on computer vision and pattern recognition, pp. 3213-3223, 2016.
Deng et al., Imagenet: A large-scale hierarchical image database, In Proceedings of the IEEE Conference on Computer Vision and Pattern Recognition, 2009.
Fischer et al., Flownet: Learning optical flow with convolutional networks. In Proceedings of the IEEE international conference on computer vision, pp. 2758-2766, 2015.
Garg et al., Unsupervised cnn for single view depth estimation: Geometry to the rescue, In European Conference on Computer Vision, pp. 740-756. Springer, 2016.
Graham, Fractional max-pooling, found at: arXiv:1412.6071v4 [cs.CV] May 12, 2015.
Jaderberg et al., Spatial transformer networks. In Advances in neural information processing systems, pp. 2017-2025, 2015.
Kendall, et al., Multi-task learning using uncertainty to weigh losses for scene geometry and semantics, In Proceedings of the IEEE Conference on Computer Vision and Pattern Recognition, found at: arXiv:1705.07115v3 [cs.CV] Apr. 24, 2018.
Kingma et al., Adam: A method for stochastic optimization, found at: arXiv preprint arXiv:1412.6980, 2014.
Klodt et al., Supervising the new with the old: Learning sfm from sfm. In European Conference on Computer Vision, pp. 713-728. Springer, 2018.
Kolesnikov, et al. Revisiting selfsupervised visual representation learning, found at: arXiv:1901.09005v1 [cs.CV] Jan. 25, 2019.
Lee, et al., Generalizing pooling functions in convolutional neural networks: Mixed, gated, and tree, In International Conference on Artificial Intelligence and Statistics (AISTATS), 2016.
Lee et al., Spigan: Privileged adversarial learning from simulation. In ICLR, 2019.
Long et al., Fully convolutional networks for semantic segmentation. In Proceedings of the IEEE conference on computer vision and pattern recognition, pp. 3431-3440, 2015.
Mahjourian et al., Unsupervised learning of depth and ego-motion from monocular video using 3d geometric constraints, In Proceedings of the IEEE Conference on Computer Vision and Pattern Recognition, pp. 5667-5675, 2018.
Manhardt et al., Roi-10d: Monocular lifting of 2d detection to 6d pose and metric shape. arXiv preprint arXiv:1812.02781, 2018.
Mayer et al., A large dataset to train convolutional networks for disparity, optical flow, and scene flow estimation. In Proceedings of the IEEE Conference on Computer Vision and Pattern Recognition, pp. 4040-4048, 2016.
Michels et al., High speed obstacle avoidance using monocular vision and reinforcement learning, In Proceedings of the 22nd international conference on Machine learning, pp. 593-600. ACM, 2005.
Paszke et al., Automatic differentiation in pytorch, 31st Conference on Neural Information Processing Systems (NIPS 2017).
Poggi et al., Learning monocular depth estimation with unsupervised trinocular assumptions, found at arXiv:1808.01606v1 [cs.CV] Aug. 5, 2018.
Ummenhofer et al., Demon: Depth and motion network for learning monocular stereo. In IEEE Conference on computer vision and pattern recognition (CVPR), vol. 5, p. 6, 2017.
Wang et al., Learning depth from monocular videos using direct methods. In Proceedings of the IEEE Conference on Computer Vision and Pattern Recognition, pp. 2022-2030, 2018.
Wang et al., Image quality assessment: from error visibility to structural similarity. IEEE transactions on image processing, 13(4):600-612, 2004.
Yang et al., Every pixel counts: Unsupervised geometry learning with holistic 3d motion understanding, In European Conference on Computer Vision, pp. 691-709. Springer, 2018.
Yin et al., GeoNet: Unsupervised learning of dense depth, optical flow and camera pose, In Proceedings of the IEEE Conference on Computer Vision and Pattern Recognition (CVPR), vol. 2, 2018.
Yu et al., Dilated residual networks, In the IEEE Conference on Computer Vision and Pattern Recognition (CVPR), Jul. 2017.
Zhang et al., Hartley spectral pooling for deep learning, Computing Research Repository, abs/1810.04028, 2018.

(56) References Cited

OTHER PUBLICATIONS

Zhou et al., Unsupervised learning of monocular depth estimation with bundle adjustment, super-resolution and clip loss, arXiv preprint arXiv: 1812.03368, 2018.
Zou et al., Df-net: Unsupervised joint learning of depth and flow using cross-task consistency, In European Conference on Computer Vision, 2018.
Godard, "Digging Into Self-Supervised Depth Estimation", found at: arXiv:1806.01260v4 [cs.CV] Aug. 17, 2019.
Geiger et al., "Vision meets robotics: The kitti dataset", The International Journal of Robotics Research, 32(11):1231-1237, 2013.
Pillai, et al., "Superdepth: Selfsupervised, super-resolved monocular depth estimation", Found at: arXiv:1810.01849, 2018.
Wu et al., "Group normalization", found at: arXiv:1803.08494v3 [cs.CV] Jun. 11, 2018.
Zhou et al., "Unsupervised learning of depth and ego-motion from video", In CVPR, vol. 2, p. 7, 2017.
Srivastava et al., "Dropout: A simple way to prevent neural networks from overfitting", Journal of Machine Learning Research 15 (2014) 1929-1958.
Chen et al., "Trainable nonlinear reaction diffusion: A flexible framework for fast and effective image restoration", found at: arXiv:1508.02848v2 [cs.CV] Aug. 20, 2016.
Chen at al., "Trainable nonlinear reaction diffusion: A flexible framework for fast and effective image restoration", found at: arXiv:1508.02848V2 [cs.CV] Aug. 20, 2016.
Dong et al., "Image superresolution using deep convolutional networks", found at: arXiv:1501.00092v3 [cs.CV] Jul. 31, 2015.

\* cited by examiner

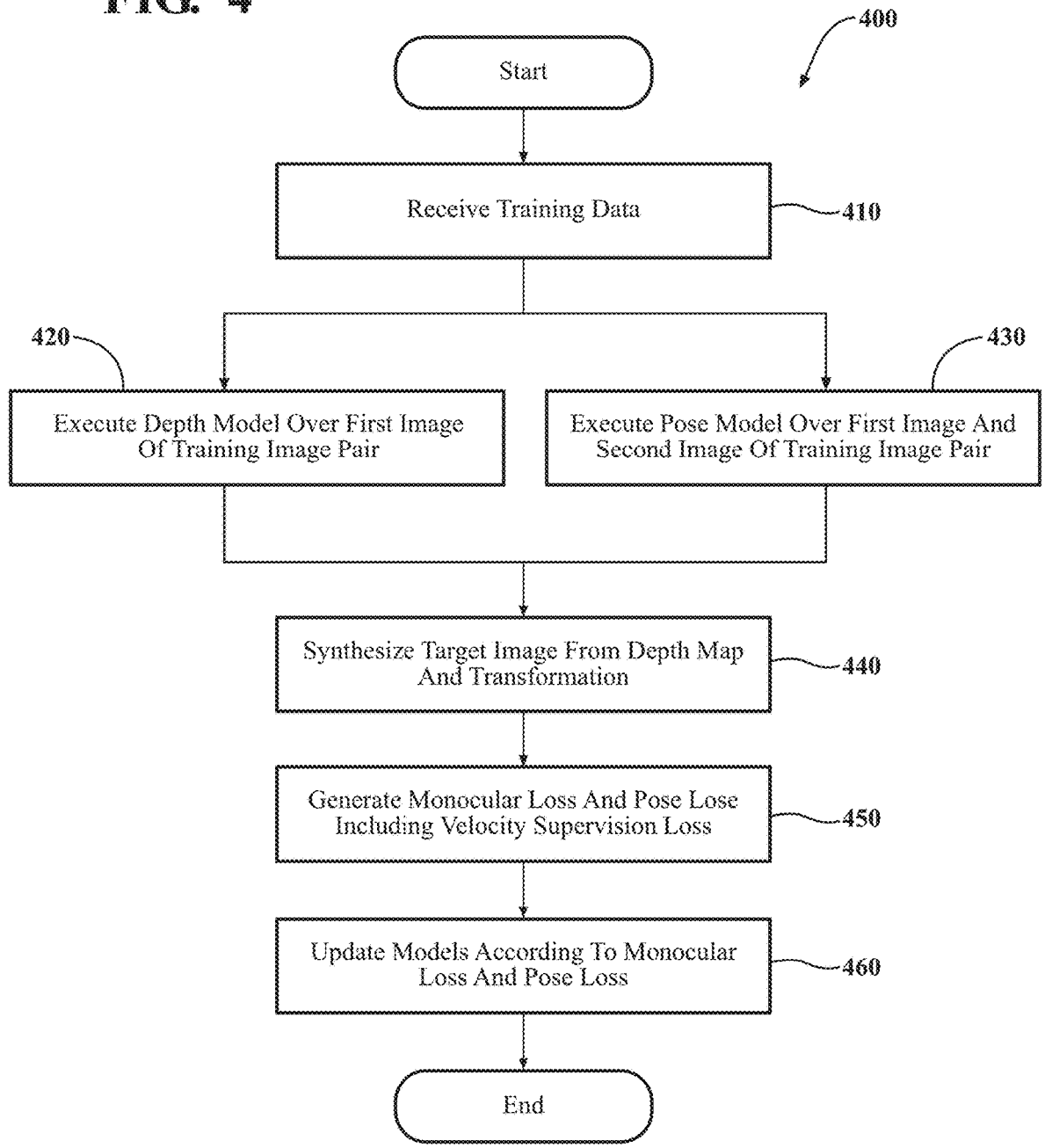

SYSTEMS AND METHODS FOR SELF-SUPERVISED SCALE-AWARE TRAINING OF A MODEL FOR MONOCULAR DEPTH ESTIMATION

TECHNICAL FIELD

The subject matter described herein relates, in general, to systems and methods for training machine learning algorithms to determine depths of a scene from a monocular image, and, more particularly, to training a depth model in combination with a pose model using a loss function that includes a velocity component to account for ego-motion in training data.

BACKGROUND

Various devices that operate autonomously or that provide information about the surrounding environment use sensors that facilitate perceiving obstacles and additional aspects of the surrounding environment. For example, a robotic device uses information from the sensors to develop an awareness of the surrounding environment in order to navigate through the environment and avoid hazards. In particular, the robotic device uses the perceived information to determine a 3-D structure of the environment in order to identify navigable regions and potential hazards.

The ability to perceive distances through estimation of depth using sensor data provides the robotic device with the ability to plan movements through the environment and generally improve situational awareness about the environment. However, depending on the available onboard sensors, the robotic device may acquire a limited perspective of the environment, and, thus, encounter difficulties in distinguishing aspects of the environment.

That is, various sensors perceive different aspects of the environment differently and also have different implementation characteristics. For example, LiDAR is effective at perceiving depth in the surrounding environment but suffers from difficulties such as high costs and can encounter errors in certain weather conditions. Moreover, other sensors, such as stereo cameras, function to effectively capture depth information but also suffer from difficulties with cost, limited field-of-view, and so on. Additionally, while monocular cameras can be a cost-effective approach, the sensor data from such cameras does not explicitly include depth information. Instead, the robot implements processing routines that derive depth information from the monocular images.

However, leveraging monocular images to perceive depth can also suffer from difficulties such as limited resolution, image artifacts, difficulties with training the processing routines (e.g., expensive or limited availability of data), and so on. For example, various approaches to estimating depth from monocular images suffer from difficulties associated with ambiguities in scale. Many approaches to monocular depth estimation estimate up to an unknown scale factor with the scale applied as a post-processing step at, for example, test time. As such, many difficulties associated with determining depth data persist such as scale ambiguities and other difficulties that may result in reduced situational awareness for a device, and, thus, difficulties in navigating or performing other associated functions.

SUMMARY

In one embodiment, example systems, and methods relate to an improved approach to training a depth model to derive depth estimates from monocular images. For example, in one embodiment, a depth system is disclosed that employs a training architecture to support self-supervised training from monocular video. Whereas some self-supervised approaches may use stereo images to provide supervision of a training process, the depth system implements the training architecture to use monocular video instead. Thus, the depth system improves the availability of training data by not requiring specific hardware in the form of stereo cameras to generate training data and using standard monocular cameras to capture monocular video instead. In order to facilitate training on monocular video and the intrinsic depth data included therein (also referred to as structure from motion (SfM)), the training architecture implements a pose model in addition to the depth model that provides for estimating ego-motion between different frames of the monocular video parameterized as, for example, a 6-DoF transformation.

The transformation, in combination with depth data from the depth model, permits the depth system to synthesize a target monocular image (i.e., a second image of a pair including the original monocular image input to the depth model) from which the depth system derives training values in the form of losses. The depth system can then use the losses to adapt hyper-parameters of the depth and pose models to perform the training. However, simply using photometric loss and/or other appearance-centric loss functions can result in scale ambiguities in the depth estimates of the depth model since such loss functions are agnostic to the metric depth of a scene, and generally permit the estimation of depth and pose up to an unknown scale factor. Moreover, relying on the noted aspects generally involves additional processes to train the depth model that may require, for example, ground-truth LiDAR measurements to scale depth estimates. Thus, there is generally a need to be able to train the depth model to be scale aware without the use of additional scaling ground-truth data or an ambiguous scaling factor.

Thus, the depth system implements an improved loss function in training the depth and pose models that uses a velocity component to learn scale-aware depth and pose models thereby avoiding the use of secondary ground-truth data. In one approach, the velocity component includes an instantaneous velocity measurement of the camera from which the monocular video originates. The depth system uses the velocity to compute a velocity supervision loss for the pose model that assesses a pose-translation component of the transformation in comparison to the velocity over a time between two separate frames used as original input to the pose model (i.e., the target image and an additional source image of the same scene). The depth system uses the velocity supervision loss, in one embodiment, in combination with a photometric loss to adapt the pose model for separate training iterations and allows the pose model to learn metrically accurate pose estimates. Thus, through the process of training the depth model and the pose model together via synthesizing the target image and determining respective losses, the depth model effectively inherits the scale awareness imposed on the pose model via the velocity supervision loss and learns to generate metrically-scaled depth estimates. In this way, the depth system improves the performance of the depth model to provide scale-aware depth estimates without the need for secondary ground-truth data.

In one embodiment, a depth system for self-supervised training of a depth model for monocular depth estimation is disclosed. The depth system includes one or more processors and a memory communicably coupled to the one or more processors. The memory stores a network module including instructions that when executed by the one or more processors cause the one or more processors to process a first image of the pair according to the depth model to generate a depth map, and to process the first image and a second image of the pair according to a pose model to generate a transformation that defines a relationship between the pair of training images. The pair of training images are separate frames depicting a scene of a monocular video. The memory stores a training module including instructions that when executed by the one or more processors cause the one or more processors to update the pose model according to the pose loss and the depth model according to a monocular loss to improve scale awareness of the depth model in producing depth estimates. The pose loss includes at least a velocity component that accounts for motion of a camera between the training images.

In one embodiment, a non-transitory computer-readable medium for self-supervised training of a depth model for monocular depth estimation and including instructions that when executed by one or more processors cause the one or more processors to perform various functions is disclosed. The instructions include instructions to process a first image of the pair according to the depth model to generate a depth map. The instructions include instructions to process the first image and a second image of the pair according to a pose model to generate a transformation that defines a relationship between the pair of training images. The pair of training images are separate frames depicting a scene of a monocular video. The instructions include instructions to update the pose model according to the pose loss and the depth model according to a monocular loss to improve scale awareness of the depth model in producing depth estimates. The pose loss includes at least a velocity component that accounts for motion of a camera between the training images.

In one embodiment, a method for self-supervised training of a depth model for monocular depth estimation is disclosed. In one embodiment, the method includes, in response to receiving a pair of training images, processing a first image of the pair according to the depth model to generate a depth map. The method includes processing the first image and a second image of the pair according to a pose model to generate a transformation that defines a relationship between the pair of training images. The pair of training images are separate frames depicting a scene of a monocular video. The method includes generating a monocular loss and a pose loss, the pose loss including at least a velocity component that accounts for motion of a camera between the training images. The method includes updating the pose model according to the pose loss and the depth model according to the monocular loss to improve scale awareness of the depth model in producing depth estimates.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 is a flowchart illustrating one embodiment of a method for training a depth model in combination with a pose model over images from a monocular video.

DETAILED DESCRIPTION

Figure 1:
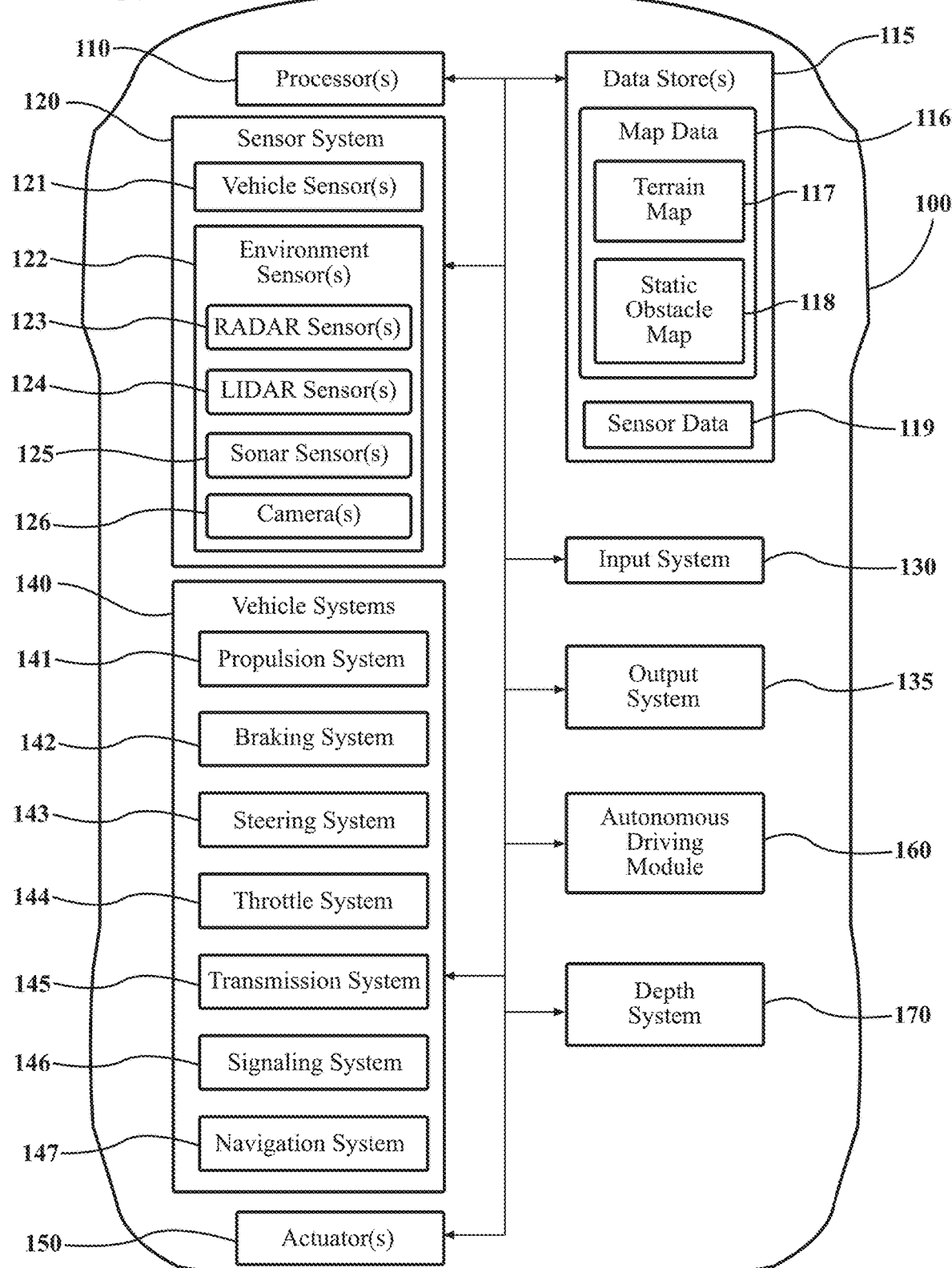
FIG. 1 illustrates one embodiment of a vehicle within which systems and methods disclosed herein may be implemented.

Systems, methods, and other embodiments associated with an improved approach to training a depth model to derive depth estimates from monocular images are disclosed herein. As previously noted, perceiving aspects of the surrounding environment can represent different challenges depending on which sensors a device employs to support the endeavor. In particular, difficulties with using monocular cameras to perceive depths in the surrounding environment can complicate the use of such sensors. That is, because a system trains and implements additional routines to derive the depth data from monocular images, difficulties can arise in relation to incomplete depth data and/or aberrations in the derived depth data from characteristics of the processing approach (e.g., scale ambiguity). The difficulties can cause the depth estimates to be unreliable for resolving aspects of the environment, thereby resulting in an incomplete situational awareness of the environment and potentially being unable to perform tasks that rely on such data.

Therefore, in one embodiment, a depth system is disclosed that employs a training architecture to support self-supervised training from monocular video to overcome the noted difficulties. For example, whereas some self-supervised approaches may use stereo images to provide supervision of a training process, the depth system implements the training architecture to use monocular video (i.e., separate frames of a scene from the video) instead. Thus, the depth system improves the availability of training data by supporting cheaper and more common monocular cameras to generate training data. In order to facilitate training on monocular video and the intrinsic depth data included therein (also referred to as structure from motion (SfM)), the training architecture implements a pose model in addition to the depth model to support training the depth model.

The pose model, in at least one approach, provides for estimating ego-motion between different frames of the monocular video that is parameterized as, for example, a 6-DoF transformation. The transformation, in combination with depth data from the depth model, permits the depth system to synthesize a target monocular image (i.e., the original monocular image input to the depth model) from which the depth system derives training values in the form of losses. The depth system can then use the losses to adapt hyperparameters of the depth and pose models to perform the training.

However, simply using photometric loss and/or other appearance-centric loss functions can result in scale ambiguities in the depth estimates of the depth model since such loss functions are agnostic to the metric depth of a scene, and generally permit the estimation of depth and pose up to an unknown scale factor. Moreover, relying on the noted aspects generally involves additional processes to train the depth model that may require, for example, ground-truth LiDAR measurements to scale depth estimates. Thus, there is generally a need to be able to train the depth model to be scale aware without the use of additional scaling ground-truth data.

To resolve this difficulty, the depth system implements an improved loss function that uses a velocity component to cause the pose and depth models to learn awareness of scale thereby avoiding the use of secondary ground-truth data and/or scaling factors. In one approach, the velocity component includes an instantaneous velocity measurement of the camera from which the monocular video originates. The depth system uses the velocity to compute a velocity supervision loss for training the pose model that assesses a pose-translation component of the transformation in comparison to the velocity over a time between two separate frames that are original inputs to the pose model (i.e., the target image and an additional source image of the same scene). The depth system uses the velocity supervision loss, in one embodiment, in combination with a photometric loss as a pose loss for adapting the pose model across separate training iterations.

Incorporating the velocity supervision loss into the pose loss allows the pose model to learn metrically accurate pose estimates. Thus, through the process of training the depth model and the pose model together via synthesizing the target image and determining respective losses, the depth model effectively inherits the scale awareness imposed on the pose model via the velocity supervision loss and learns to generate metrically-scaled depth estimates. In this way, the depth system improves the performance of the depth model to provide scale-aware depth estimates without the need for secondary ground-truth data.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, proceeds through an environment according to assessed aspects of the environment, and thus benefits from the functionality discussed herein. In yet further embodiments, the vehicle 100 may instead be a statically mounted device, an embedded device, or another device that uses monocular images to derive depth information about a scene or that separately trains the depth model for deployment in such a device.

In any case, the vehicle 100 (or another robotic device) also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to process monocular images and provide depth estimates for an environment (e.g., objects, surfaces, etc.) depicted therein. Moreover, while depicted as a stand-alone component, in one or more embodiments, the depth system 170 is integrated with the autonomous driving module 160, the camera 126, or another component of the vehicle 100. The noted functions and methods will become more apparent with a further discussion of the figures.

Figure 2:
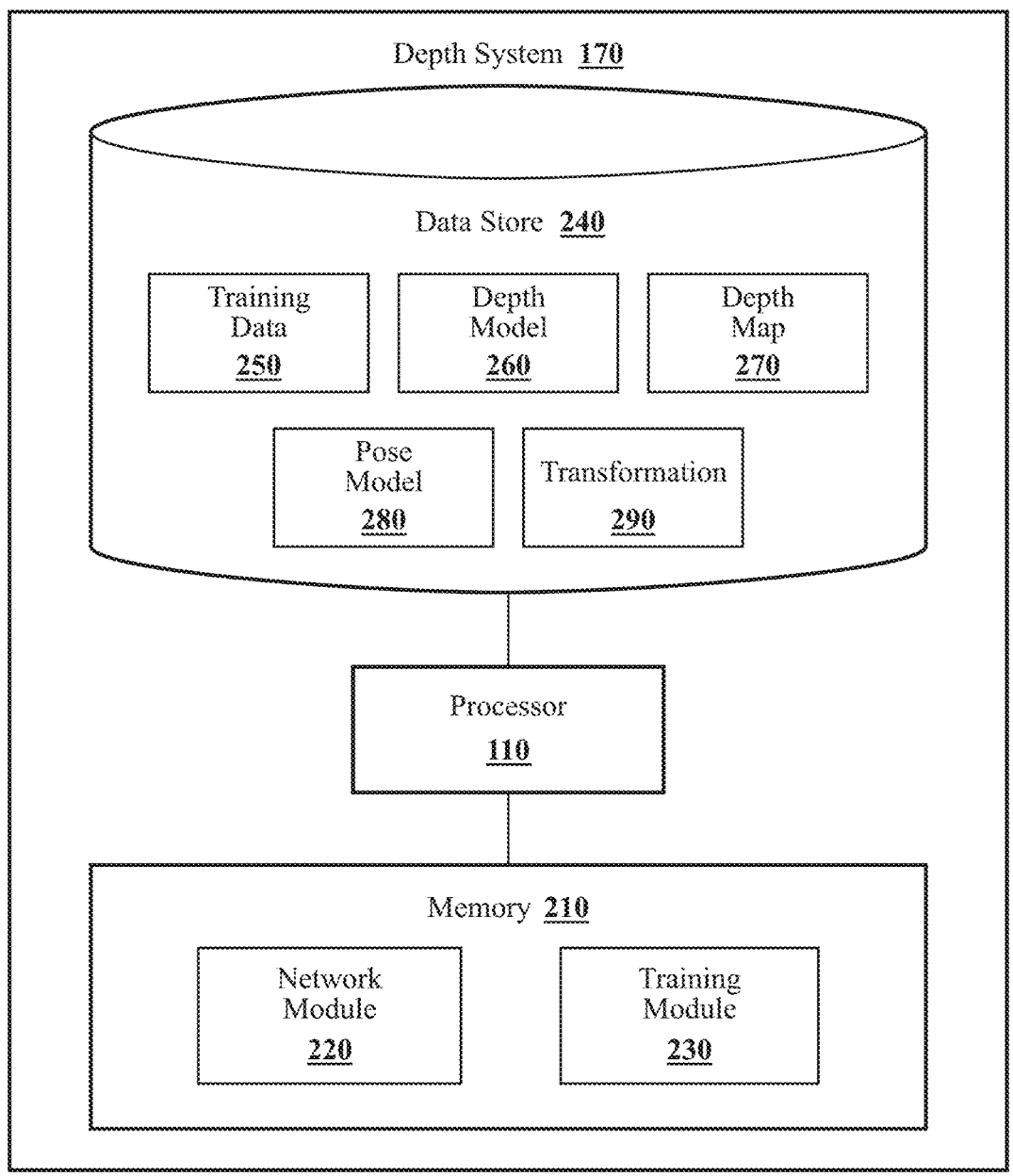
FIG. 2 illustrates one embodiment of a depth system that is associated with training a depth model.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a network module 220 and a training module 230. In general, the processor 110 is an electronic processor such as a microprocessor that is capable of performing various functions as described herein. In one embodiment, the depth system 170 includes a memory 210 that stores the network module 220 and the training module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the depth system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes training data 250 (e.g., monocular images from video), a depth model 260, a depth map(s) 270, a pose model 280, and a transformation(s) 290 along with, for example, other information that is used by the modules 220 and 230.

As noted, the training data 250 generally includes one or more monocular videos that are comprised of a plurality of frames in the form of monocular images. As described herein, a monocular image is, for example, an image from the camera 126 that is part of a video and that encompasses a field-of-view about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126. In further aspects, the camera 126 is an array of two or more cameras that capture multiple images of the surrounding environment and stitch the images together to form a comprehensive 360-degree view of the surrounding environment.

In either case, the image itself includes visual data of the FOV that is encoded according to a video standard (e.g., codec) associated with the camera 126. In general, characteristics of the camera 126 and the video standard define a format of the image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the image is a monocular image in that there is no explicit additional modality indicating depth. In contrast to a stereo image that may integrate left and right images from separate cameras mounted side-by-side to provide an additional depth channel, the monocular image does not include explicit depth information such as disparity maps derived from comparing the stereo images pixel-by-pixel. Instead, the monocular image implicitly provides depth information in the relationships of perspective and size of elements depicted therein from which the depth model 260 derives the depth map 270.

Moreover, the monocular video may include observations of many different scenes. That is, as the camera 126 or another original source camera of the video progresses through an environment, perspectives of objects and features in the environment change and the depicted objects/features themselves also change thereby depicting separate scenes (i.e., particular combinations of objects/features). Thus, the depth system 170 may extract particular training pairs of monocular images from the monocular video for training. In particular, the depth system 170 generates the pairs from the video so that the pairs of images are of the same scene. As should be appreciated, the video includes a series of monocular images that are taken in succession according to a configuration of the camera. Thus, the camera may generate the images (also referred to herein as frames) of the video at regular intervals such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the pairs from successive ones (i.e., adjacent) of the images, but instead can generally pair separate images of the same scene that are not successive. Thus, in one approach, the depth system 170 pairs every other image depending on the fps. In a further approach, the depth system pairs every fifth image as a training pair. The greater the timing difference in the video between the pairs, the more pronounced a difference in camera position; however, this may also result in fewer shared features/objects between the images. As such, as previously noted, the pairs of training images are of a same scene and are generally constrained, in one or more embodiments, to be within a defined number of frames (e.g., 5 or fewer) to ensure correspondence of an observed scene between the images. In any case, the pairs of training images generally have the attributes of being monocular images from a monocular video that are separated by some interval of time (e.g., 0.06 s) such that a perspective of the camera changes between the pair of images as a result of motion of the camera through the environment while generating the video.

Additionally, the training data, in one or more embodiments, further includes velocity data. The velocity data may take different forms depending on the implementation but generally includes instantaneous velocity measurements of the camera at the time of the separate images in the monocular video. Thus, in one approach, the velocity data is provided by a sensor of the vehicle 100 or another device to which the camera 126 is mounted. In further embodiments, the depth system 170 derives the velocity data from the pair of images through a process of comparing movement between identified features and knowing the change in time between the images. In any case, the velocity is embedded with the video as, for example, metadata, and used by the depth system 170 in computing the velocity supervision loss.

With further reference to FIG. 2, the depth system 170 further includes the depth model 260, which produces the depth map 270, and the pose model 280, which produces the transformation 290. Both of the models 260 and 280 are, in one embodiment, machine learning algorithms. However, the particular form of either model is generally distinct. That is, for example, the depth model 260 is a machine learning algorithm that accepts an electronic input in the form of a single monocular image and produces the depth map 270 as a result of processing the monocular image. The exact form of the depth model 260 may vary according to the implementation but is generally a convolutional type of neural network.

The depth model 260, in one embodiment, has an encoder/decoder architecture. The encoder/decoder architecture generally includes a set of neural network layers including convolutional components (e.g., 2D and/or 3D convolutional layers) that flow into deconvolutional components (e.g., 2D and/or 3D deconvolutional layers). In one approach, the encoder accepts the image as an electronic input and processes the image to extract features from the image. The features are, in general, aspects of the image that are indicative of spatial information that is intrinsically encoded therein. As such, encoding layers that form the encoder function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder is comprised of multiple encoding layers formed from a combination of two-dimensional (2D) convolutional layers, packing blocks, and residual blocks. Moreover, the separate encoding layers generate outputs in the form of encoded feature maps (also referred to herein as tensors), which the encoding layers provide to subsequent layers in the model 260. Thus, the encoder includes a variety of separate layers that operate on the monocular image, and subsequently on derived/intermediate feature maps that convert the visual information of the monocular image into embedded state information in the form of encoded features of different channels.

In one embodiment, the decoder unfolds (i.e., adapt dimensions of the tensor to extract the features) the previously encoded spatial information in order to derive the depth map 270 according to learned correlations associated with the encoded features. That is, the decoding layers generally function to up-sample, through, in one approach, sub-pixel convolutions and other mechanisms, the previously encoded features into the depth map 270. In one embodiment, the decoding layers comprise unpacking blocks, two-dimensional convolutional layers, and inverse depth layers that function as output layers for different scales of the feature map 270. The depth map 270 is, in one embodiment, a data structure corresponding to the input image that indicates distances/depths to objects/features represented therein. Additionally, in one embodiment, the depth map 270 is a tensor with separate data values indicating depths for corresponding locations in the image on a per-pixel basis.

Moreover, the depth model 260 can further include skip connections for providing residual information between the encoder and the decoder to facilitate memory of higher-level features between the separate components. While a particular encoder/decoder architecture is discussed, as previously noted, the depth model 260, in various approaches, may take different forms and generally functions to process the monocular images and provide depth maps that are per-pixel estimates about distances of objects/features depicted in the images.

By contrast, the pose model 280 accepts two monocular images of the same scene as an electronic input and processes the monocular images to produce estimates of camera ego-motion in the form of a set of 6 degree-of-freedom (DOF) transformations between the two images. The pose model 280 itself is, for example, a convolutional neural network (CNN) or another learning model that is differentiable and performs dimensional reduction of the input images to produce the transformation 290. In one approach, the pose model 280 includes 7 stride-2 convolutions, a 1×1 convolution with 6*(N-1) output channels corresponding to 3 Euler angles and a 3-D translation for one of the images (source image), and global average pooling to aggregate predictions at all spatial locations. The transformation 290 is, in one embodiment, a 6 DOF rigid-body transformation belonging to the Special Euclidean group SE(3) that represents the change in pose between the pair of images provided as input to the model 280. In any case, the pose model 280 performs a dimensional reduction of the monocular images to derive the transformation 290 therefrom.

As an additional note, while the depth model 260 and the pose model 280 are shown as discrete units separate from the network module 220, the depth model 260 and the pose model 280 are, in one or more embodiments, generally integrated with the network module 220. That is, the network module 220 functions to execute various processes of the models 260/280 and use various data structures of the models 260/280 in support of such execution. Accordingly, in one embodiment, the network module 220 includes instructions that function to control the processor 110 to generate the depth map 270 using the depth model 260 and generate the transformation 290 using the pose model 280 as disclosed.

Figure 3:
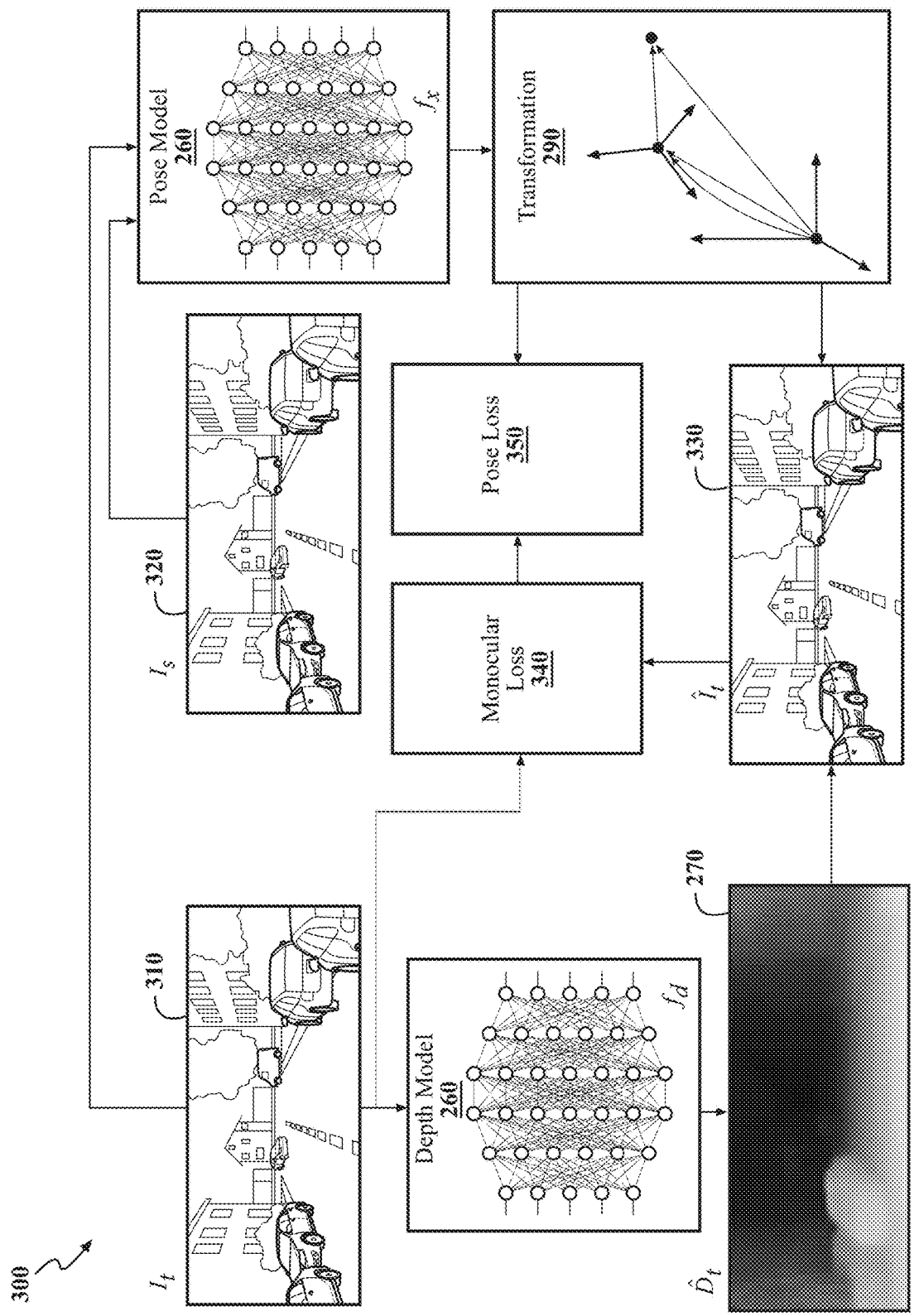
FIG. 3 illustrates one embodiment of a training architecture that includes a depth model and a pose model for self-supervised monocular depth estimation.

As a further explanation of the training architecture formed in relation to the depth model 260 and the pose model 280, consider FIG. 3 along with additional discussion of the functionality of the components of FIG. 2. FIG. 3 illustrates one embodiment of a training architecture 300 that denotes various relationships between the depth model 260, the pose model 280, and inputs/outputs thereof. As shown in FIG. 3, the training data 250 includes a first image 310 and a second image 320 of a training pair.

Accordingly, the network module 220 generally includes instructions that function to control the processor 110 to execute various actions associated with the depth model 260 and the pose model 280. For example, in one embodiment, the network module 220 functions to process the first image 310 of a pair of training images from the training data 250 according to the depth model 260 to produce the depth map 270 for training. Of course, while the present discussion focuses on training the depth model 260, the network module 220, in further embodiments, also uses the depth model 260 to generate the depth map 270 for additional purposes, once trained, such as resolving aspects of an environment for hazard avoidance, path planning, and so on.

In any case, the network module 220 also functions to execute the models 260 and 280 in concert (e.g., in parallel) for purposes of training, and, in one or more embodiments, at the direction of the training module 230. Thus, in addition to executing the model 260, the network module 220, in one embodiment, processes the first image 310 and the second image 320 from the pair of training images to generate the transformation 290. Thus, the network module 220 generally operates to execute the models 260 and 280 over the training data 250, while the training module 230 functions to perform the explicit training processes.

Thus, in one embodiment, the training module 230 generally includes instructions that function to control the processor 110 to train the depth model 260 and the pose model 280 according to a self-supervised scale-aware process. The self-supervised SfM learning regime shown in FIG. 3 and executed by the training module 230 generally forces the depth model 260 to adapt internal weights to the target environment while retaining scale-consistency enforced in the pose model 280 via the velocity supervision loss as discussed in greater detail subsequently.

Accordingly, the training module 230 may initially execute various actions in support of the network module 220 as part of the training. For example, in one embodiment, the training module 230 receives the training data 250 including the pair of monocular images 310/320 and provides the images to the network module 220. The training module 230, in one or more approaches, receives the images by controlling the camera 126 to capture the images, by passively acquiring the image from a data bus or electronic memory as part of a defined set of information that forms the training data 250, and so on. The training module 230 may also perform pre-processing on the images 310/320 to provide the images in a format that is accepted by the depth model 260 and the pose model 280.

In any case, once the network module 220 executes the models 260/280 over the images 310/320 to produce the depth map 270 and the transformation 290, the training module 230 generates the synthesized image 330. In one embodiment, the synthesized image 330 is, for example, a synthesized version of the first image 310 according to the depth map 270 and the transformation 290. That is, the process of training the depth model 260 in the structure from motion (SfM) context involves synthesizing an image for comparison with the first image 310 that is of the same scene. The training module 230 generates the synthesized image 330 using a machine learning algorithm such as a generative neural network (e.g., encoder/decoder architecture, a generative adversarial network (GAN), an autoencoder, etc.), a convolutional neural network (CNN), or another suitable architecture that accepts the depth map 270 and the transformation 290 as input and produces the synthesized image 330 as output.

From this synthesized image 330, the training module 230 can generate a monocular loss 340 and a pose loss 350. Thus, the training module 230 formulates the generation of the depth map 270 as a photometric error minimization across the images 310/320 (e.g., $I_{t-1}$ and $I_{t+1}$). The training module 230 can then compare the synthesized image 330 and the original first image 310 to determine the monocular loss 340, which is embodied as, for example, the photometric loss. This loss characterizes an accuracy of the depth model 260 in producing the depth map 270. Thus, the training module 230 can then use the calculated loss to adjust the depth model 260. Additionally, the training module 230 uses the monocular loss 340 in combination with a velocity supervision loss that is derived from the instantaneous velocity to generate the pose loss 350.

As further explanation consider that in the self-supervised monocular SfM context, the training module 230 is generally configured with a goal of (i) a monocular depth model $f_p$: I→D, that predicts the scale-ambiguous depth $\overline{D}=f_p(I(p))$ (e.g., depth model 260) for every pixel p in the target image I; and (ii) a monocular ego-motion estimator $f_x$: $(I_t, I_s)$ (e.g., pose model 280), that predicts the set of 6-DoF rigid-body transformations for all s ∈ S given by $$x_{t \to s} = \begin{pmatrix} R & t \\ 0 & 1 \end{pmatrix} \in SE(3),$$

between the target image $I_t$ (i.e., the first image 310) and the set of source images $I_s \in I_S$ considered as part of the temporal context. As a point of implementation, in one or more embodiments, the training module 230 uses frames $I_{t-1}$ and $I_{t+1}$ as source images, although a larger context, as previously noted, is possible.

The training module 230 implements the training objective for the depth model 260 and the pose model 280 according to equation (1), with the monocular loss 340 as shown in equation (2).

$$\hat{\theta}_D, \hat{\theta}_x = \operatorname{argmin} \sum_{s \in S} \mathcal{L}_{mono}(I_t, \hat{I}_t; \theta_D, \theta_x) \quad (1)$$

$$\mathcal{L}(I_t, \hat{I}_t) = \mathcal{L}_p(I_t, \hat{I}_t) \odot M_t + \lambda_1 \mathcal{L}_s(\hat{D}_t) \quad (2)$$

In one aspect, $M_t$ is implemented as a binary mask that avoids computing the photometric loss on the pixels that do not have a valid mapping (e.g., pixels from the separate images that do not project onto the target image given the estimated depth), $\lambda_1, \lambda_2$ represent weights for adjusting the loss terms in eq (2) and (6). $\mathcal{L}_p$ represents appearance matching loss and is implemented according to, in one embodiment, a pixel-level similarity between the target image $I_t$ and the synthesized image $\tilde{I}_t$ using a structural similarity (SSIM) term combined with a photometric loss term as shown in equation (3). $\mathcal{L}_s$ represents disparity smoothness loss and is implemented to regularize disparities in textureless low-image gradient regions, as shown in equation (4).

$$\mathcal{L}_p(I_t, \hat{I}_t) = \alpha \frac{1 - SSIM(I_t, \hat{I}_t)}{2} + (1-\alpha)\|I_t - \hat{I}_t\| \quad (3)$$

$$\mathcal{L}_s(\hat{D}_t) = |\delta_x \hat{D}_t| \, e^{-|\delta_x I_t|} + |\delta_y \hat{D}_t| \, e^{-|\delta_y I_t|} \quad (4)$$

Through this training process, the model 260 develops a learned prior of the monocular images as embodied by the internal parameters of the model 260 from the training on the images. In general, the model 260 develops the learned understanding about how depth relates to various aspects of an image according to, for example, size, perspective, and so on. Consequently, the resulting trained depth model 260 is leveraged by the depth system 170 to estimate depths from monocular images that do not include an explicit modality identifying the depths. Thus, the above generally represents the monocular loss 340, which may result in scale ambiguities when applied in isolation.

However, the training module 230 further employs the pose loss 350, which includes a velocity component embodied as a velocity supervision loss $\mathcal{L}_v$ as shown in equations (5) and (6). As such, during training, the training module 230 further leverages the velocity information that is embedded with the training data 250 to generate the velocity supervision loss $\mathcal{L}_v$ as a component of the pose loss $\mathcal{L}_{scale}$ scale 350.

$$\mathcal{L}_v(\hat{t}_{t \to s}, v) = \||\hat{t}| - |v|\Delta T_{t \to s}\| \quad (5)$$

$$\mathcal{L}_{scale}(I_t, \hat{I}_t, v) = \mathcal{L}(I_t, \hat{I}_t) + \lambda_2 \mathcal{L}_v(\hat{t}_{t \to s}, v) \quad (6)$$

The training module 230 imposes the velocity supervision loss $\mathcal{L}_v$ between the magnitude of the pose-translation component of the pose model 280 prediction of $\hat{t}$ and the velocity scalar v multiplied by the time difference between target and source frames $\Delta T_{t \to s}$, as shown in (5). The additional velocity supervision loss $\mathcal{L}_v$ allows the pose model 280 to learn metrically accurate pose estimates subsequently resulting in the depth model 260 learning metrically scaled depth estimates as inherited through the architecture 300 and the combined training process.

It should be appreciated that the training module 230 trains the depth model 260 and the pose model 280 together in an iterative manner over the training data 250 that includes a plurality of monocular images from monocular video. Through the process of training the model 260, the training module 230 adjusts various hyper-parameters in the model 260 to fine-tune the functional blocks included therein. Through this training process, the model 260 develops a learned prior of the monocular images as embodied by the internal parameters of the model 260. In general, the model 260 develops the learned understanding about how depth relates to various aspects of an image according to, for example, size, perspective, and so on. Consequently, the resulting trained depth model 260 is leveraged by the depth system 170 to estimate depths from monocular images that do not include an explicit modality identifying the depths.

Additional aspects of generating depth estimates from monocular images will be discussed in relation to FIG. 4. FIG. 4 illustrates a flowchart of a method 400 that is associated with self-supervised training of a depth model for monocular depth estimation. Method 400 will be discussed from the perspective of the depth system 170 and associated models of FIGS. 1-3. While method 400 is discussed in combination with the depth system 170, it should be appreciated that the method 400 is not limited to being implemented within the depth system 170 but is instead one example of a system that may implement the method 400.

At 410, the training module 230 receives the training data 250 including a pair of monocular training images. In one embodiment, the training module 230 acquires the training images locally from co-located systems with the depth system 170 (e.g., the camera 126) in an active manner, while in further embodiments, the training module 230 may acquire the training images through a communication link with a remote system or from a repository of such information as included in the data store 240. Thus, while the depth system 170 can be implemented within a particular device that is, for example, actively navigating an environment, the depth system 170 may also function as a cloud-based computing service to train the depth model 260 and/or to analyze monocular images for depth information.

Furthermore, receiving the training data 250 also includes, in one embodiment, receiving velocity data associated with the source of the monocular video. That is, whether the velocity data is embedded with the monocular training images or is provided separately, the training data 250 includes instantaneous velocity for, in one approach, each separate image of the video. As previously mentioned, the velocity data is generally a scalar quantity indicating a speed of the camera 126 at a point in time when a corresponding image is captured in the video. Thus, the camera 126 or the depth system 170 may acquire the velocity data from a separate sensor of the vehicle 100 or other robotic device within which the camera 126 is mounted while moving through an environment, correlate the velocity data with respective frames, and store the velocity data with the images as the training data 250.

As previously described, the monocular video from which the training images are derived may have different characteristics according to different implementations but generally is a single monocular video (i.e., from a camera having a single imaging device) that does not include explicit depth information. Moreover, when functioning in a capacity separate from training, the depth system 170 generally accepts individual monocular images that may or may not be from a video source.

At 420, the network module 220 executes the depth model 260 to process a first image of a training pair to generate the depth map 270. In general, execution of the depth model 260 to produce the depth map 270 at 420 is a routine execution as though the depth model 260 were operating to provide the depth map 270 for intended purposes under deployment conditions. That is, in general, there is no variation in the way in which the model 260 is executed during training since the overall goal is to have the model 260 produce the map 270 according to learned weights and as it would in routine conditions so that the training module 230 can subsequently assess the performance of the model 260 and adapt the model 260 as may be needed to improve operation. Thus, the depth system 170 generally executes the models 260/280 over many iterations of the method 400 to perform the training.

At 430, the network module 220 executes the pose model 280 to process the first image and a second image of the training pair to generate the transformation 290. As indicated in relation to block 420, the execution of the pose model 280 is generally routine at 430 and as would occur under normal operating conditions. Although the pose model 280 may be used in various circumstances for generating transformations, the depth system 170 generally uses the pose model 280 for the limited application of training the depth model 260. Thus, when implemented as part of the depth system 170, the pose model 280 may reside in an idle state when the system 170 is not training the depth model. In any case, the network module 220 generally executes the models 260/280 in parallel during training to generate the map 270 and the transformation 290 to facilitate the overall self-supervised training process. That is, the pose model 280 functions to facilitate the self-supervised structure from motion (SfM) training regime by providing the transformation 290 from which the training module 230 may assess the performance of the depth model 260. Of course, as an additional aspect of using the pose model 280 to generate the transformation 290, the training module 230 also trains the pose model 280 and does so in combination with the depth model 260.

At 440, the training module 230 synthesizes a target image $\hat{I}_t$ from the depth map 270 and the transformation 290. This synthesized target image $\hat{I}_t$ generally corresponds to the first training image $I_t$ as opposed to the second training image $I_s$ of the pair $I_t$, $I_s$. That is, the training module 230 reconstructs the first image 310 ($I_t$), which is provided into the depth model 260 and to which the depth map 270 $\hat{D}_t$ corresponds. Thus, the training module 230 generates the synthetic target image $\hat{I}_t$ as a view of the same scene depicted by the depth map 270 and the second training images $I_t$, $I_s$. In one embodiment, the training module 230 generates the synthetic image 330 according to a warping operation that functions to adapt a viewpoint of the camera. In various approaches, the training module 230 may implement different algorithms to perform the warping, which may include a convolutional neural network (CNN) or other machine learning architecture.

At 450, the training module 230 computes the monocular loss 340 and the pose loss 350. In one embodiment, the training module 230 computes the pose loss 350 to include at least a velocity component (i.e., velocity supervision loss via the scalar instantaneous velocity) that accounts for motion of the camera between the training images. In one embodiment, the training module 230 initially calculates the monocular loss 340 according to a comparison between the synthetic image and the target image (i.e., the first image 310 of the pair) according to the photometric loss function, which may include an appearance loss, a regularization loss, and/or other components that are appearance-based.

Additionally, the training module 230, in one embodiment, generates the pose loss 350 by calculating the velocity component as a difference between a pose translation, which is output as part of the transformation 290, and the instantaneous velocity, which may be multiplied by a time difference between capturing the pair of training images 310/320. In this way, the training module 230 includes an additional loss component that causes the models 260/280 to learn scale and thereby overcome the difficulties of scale ambiguity in the depth map 270 when generated without such a controlling signal.

At 460, the training module 230 updates the pose model 280 according to the pose loss 350 and the depth model 260 according to the monocular loss 340 to improve scale awareness of the depth model 260 in producing depth estimates (i.e., the depth map 270). In one embodiment, the training module 230 updates the pose model 280 in combination with the depth model 260 using the pose loss 350 and the monocular loss 340 to adapt weights in the models 260/280 while retaining scale-consistency inherited from using the velocity component in the pose loss 350 to update the pose model. Therefore, the disclosed training approach implemented by the depth system 170 simplifies the process of constraining the depth and pose learned in the monocular SfM setting to be metrically scaled, by (i) removing the need for additional hardware (e.g., stereo cameras); (ii) removing the need of a simulator to first train a metrically accurate depth predicting network, which then has to be distilled into a network operating in the real-world; and (iii) removes the need of prior extrinsic calibration of the camera (e.g. for measuring the camera height/estimating the distance to the ground plane). In this way, the depth system 170 improves the depth model 260 to produce improved depth estimates that translate into improved situational awareness of the implementing device (e.g., the vehicle 100), and improved abilities to navigate and perform other functions therefrom.

It should be appreciated that the network module 220 can further leverage the depth model 260 once trained to analyze monocular images from the camera 126 and provide the depth map 270 to additional systems/modules in the vehicle 100 in order to control the operation of the modules and/or the vehicle 100 overall. In still further aspects, the network module 220 communicates the depth map 270 to a remote system (e.g., cloud-based system) as, for example, a mechanism for mapping the surrounding environment or for other purposes (e.g., traffic reporting, etc.). As one example, the network module 220, in one approach, uses the depth map 270 to map locations of obstacles in the surrounding environment and plan a trajectory that safely navigates the obstacles. Thus, the network module 220 may, in one embodiment, control the vehicle 100 to navigate through the surrounding environment.

In further aspects, the network module 220 conveys the depth map 270 to further internal systems/components of the vehicle 100 such as the autonomous driving module 160. By way of example, in one arrangement, the network module 220 generates the depth map 270 using the trained depth model 260 and conveys the depth map 270 to the autonomous driving module 160 in a particular scale that the module 160 accepts as an electronic input. In this way, the depth system 170 informs the autonomous driving module 160 of the depth estimates to improve situational awareness and planning of the module 160. It should be appreciated that the autonomous driving module 160 is indicated as one example, and, in further arrangements, the network module 220 may provide the depth map 270 to the module 160 and/or other components in parallel or as a separate conveyance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system for self-supervised training of a depth model for monocular depth estimation, comprising:
   one or more processors;
   a memory communicably coupled to the one or more processors and storing:
   a network module including instructions that when executed by the one or more processors cause the one or more processors to:
      process a first image of a pair of training images according to the depth model to generate a depth map, and
      process the first image and a second image of the pair according to a pose model to generate a transformation that defines a relationship between the pair of training images, wherein the pair of training images are separate frames of a monocular video depicting a scene; and
   a training module including instructions that when executed by the one or more processors cause the one or more processors to update the pose model according to a pose loss and to update the depth model according to a monocular loss to improve scale awareness of the depth model in producing depth estimates, wherein the pose loss includes at least a velocity component that accounts for motion of a camera between the training images and that is calculated according to an instantaneous velocity of the camera at a time of capture of the pair of training images.

2. The depth system of claim 1, wherein the training module includes instructions to generate the pose loss including instructions to calculate the velocity component as a difference between a pose translation that is output as part of the transformation and the instantaneous velocity multiplied by a time difference between the pair of training images, and wherein the instantaneous velocity is a velocity scalar of the camera at a time of the pair of training images.

3. The depth system of claim 2, wherein the training module includes instructions to generate the pose loss including instructions to combine the velocity component with the monocular loss, and wherein the training module includes instructions to update the pose model including instructions to update the pose model in combination with the depth model using the pose loss and the monocular loss to adapt weights in the depth model while retaining scale-consistency inherited from using the velocity component in the pose loss to update the pose model.

4. The depth system of claim 2, wherein the training module includes instructions to generate the monocular loss including instructions to generate a synthesized version of the first image from the depth map and the transformation, and wherein the training module includes instructions to generate the monocular loss including instructions to calculate the monocular loss according to a comparison of the synthesized version with the first image.

5. The depth system of claim 1, wherein the training module includes instructions to update the depth model and the pose model as a self-supervised structure from motion (SfM) training process that accounts for motion of the camera between the training images to cause the depth model to produce the depth map to be metrically scaled without applying a separate scaling factor.

6. The depth system of claim 1, wherein the network module includes instructions to process the first image according to the depth model and process the first image and the second image according to the pose model substantially in parallel, wherein the training module includes instructions to update the depth model and the pose model iteratively over a set of training images, and wherein the monocular video provides a plurality of monocular images as training data for self-supervised training of the depth model without pre-labeled data.

7. The depth system of claim 1, wherein the depth model is a machine learning algorithm comprised of an encoder and a decoder that function to generate the depth estimates of a scene from monocular images, and wherein the pose model is a machine learning algorithm that performs a dimensional reduction of the training images to derive the transformation.

8. The depth system of claim 7, wherein the pose model is a convolutional neural network (CNN).

9. A non-transitory computer-readable medium for self-supervised training of a depth model for monocular depth estimation and including instructions that when executed by one or more processors cause the one or more processors to:

process a first image of a pair of training images according to the depth model to generate a depth map;

process the first image and a second image of the pair according to a pose model to generate a transformation that defines a relationship between the pair of training images, wherein the pair of training images are separate frames of a monocular video depicting a scene; and update the pose model according to a pose loss and the depth model according to a monocular loss to improve scale awareness of the depth model in producing depth estimates, wherein the pose loss includes at least a velocity component that accounts for motion of a camera between the training images and that is calculated according to an instantaneous velocity of the camera at a time of capture of the pair of training images.

10. The non-transitory computer-readable medium of claim 9, wherein the instructions to generate the pose loss include instructions to calculate the velocity component as a difference between a pose translation that is output as part of the transformation and the instantaneous velocity multiplied by a time difference between the pair of training images, and wherein the instantaneous velocity is a velocity scalar of the camera at a time of the pair of training images.

11. The non-transitory computer-readable medium of claim 10, wherein the instructions to generate the pose loss include instructions to combine the velocity component with the monocular loss, and wherein the instructions to update the pose model include instructions to update the pose model in combination with the depth model using the pose loss and the monocular loss to adapt weights in the depth model while retaining scale-consistency inherited from using the velocity component in the pose loss to update the pose model.

12. The non-transitory computer-readable medium of claim 10, wherein the instructions to generate the monocular loss include instructions to generate a synthesized version of the first image from the depth map and the transformation, and wherein the instructions to generate the monocular loss include instructions to calculate the monocular loss according to a comparison of the synthesized version with the first image.

13. The non-transitory computer-readable medium of claim 9, wherein the instructions to update the depth model and the pose model include instructions to train as a self-supervised structure from motion (SfM) training process that accounts for motion of the camera between the training images to cause the depth model to produce the depth map to be metrically scaled without applying a separate scaling factor.

14. A method, comprising:

processing a first image of a pair of training images according to a depth model to generate a depth map;

processing the first image and a second image of the pair according to a pose model to generate a transformation that defines a relationship between the pair of training images, wherein the pair of training images are separate frames depicting a scene of a monocular video;

generating a monocular loss and a pose loss, the pose loss including at least a velocity component that accounts for motion of a camera between the training images and that is calculated according to an instantaneous velocity of the camera at a time of capture of the pair of training images; and updating the pose model according to the pose loss and the depth model according to the monocular loss to improve scale awareness of the depth model in producing depth estimates.

15. The method of claim 14, wherein generating the pose loss includes calculating the velocity component as a difference between a pose translation that is output as part of the transformation and the instantaneous velocity multiplied by a time difference between the pair of training images, and wherein the instantaneous velocity is a velocity scalar of the camera at a time of the pair of training images.

16. The method of claim 15, wherein generating the pose loss includes combining the velocity component with the monocular loss, wherein updating the pose model in combination with the depth model using the pose loss and the monocular loss adapts weights in the depth model while retaining scale-consistency inherited from using the velocity component in the pose loss to update the pose model.

17. The method of claim 14, wherein generating the monocular loss includes generating a synthesized version of the first image from the depth map and the transformation, and wherein generating the monocular loss includes calculating the monocular loss according to a comparison of the synthesized version with the first image.

18. The method of claim 14, wherein updating the depth model and the pose model is a self-supervised structure from motion (SfM) training process that accounts for motion of the camera between the training images to cause the depth model to produce the depth map to be metrically scaled without applying a separate scaling factor.

19. The method of claim 14, wherein processing the first image according to the depth model and processing the first image and the second image according to the pose model occur substantially in parallel, wherein updating the depth model and the pose model occur iteratively over a set of training images to train the pose model and the depth model, and wherein the monocular video provides a plurality of monocular images as training data for self-supervised training of the depth model without pre-labeled data.

20. The method of claim 14, wherein the depth model is a machine learning algorithm comprised of an encoder and a decoder that function to generate the depth estimates of a scene from monocular images, and wherein the pose model is a machine learning algorithm that performs a dimensional reduction of the training images to derive the transformation.

* * * * *